United States Patent
Lee et al.

(10) Patent No.: US 12,237,522 B2
(45) Date of Patent: Feb. 25, 2025

(54) BATTERY PACK COMPRISING A SUPPORT FRAME WITH AN INCLINE SURFACE

(71) Applicant: SK On Co., Ltd., Seoul (KR)

(72) Inventors: Seung Hun Lee, Daejeon (KR); Tak Kyung Yoo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/359,040

(22) Filed: Jul. 26, 2023

(65) Prior Publication Data
US 2024/0178496 A1 May 30, 2024

(30) Foreign Application Priority Data
Nov. 24, 2022 (KR) .................. 10-2022-0159545

(51) Int. Cl.
| | |
|---|---|
| H01M 50/204 | (2021.01) |
| H01M 50/258 | (2021.01) |
| H01M 50/262 | (2021.01) |
| H01M 50/507 | (2021.01) |

(52) U.S. Cl.
CPC ....... H01M 50/204 (2021.01); H01M 50/258 (2021.01); H01M 50/262 (2021.01); H01M 50/507 (2021.01)

(58) Field of Classification Search
CPC ............. H01M 50/204; H01M 50/258; H01M 50/262; H01M 50/507
See application file for complete search history.

(56) References Cited

U.S. PATENT DOCUMENTS

| | | | | |
|---|---|---|---|---|
| 2020/0161725 | A1* | 5/2020 | Kalmbach | H01M 10/6556 |
| 2020/0176747 | A1* | 6/2020 | Ogino | H01M 50/264 |

FOREIGN PATENT DOCUMENTS

| | | | |
|---|---|---|---|
| CN | 209691826 | | 11/2019 |
| CN | 110754005 | | 2/2020 |
| CN | 212810450 | | 3/2021 |
| CN | 215816196 | U | 2/2022 |
| CN | 217655954 | U * | 10/2022 |
| EP | 3883007 | A1 | 9/2021 |
| JP | 2018032519 | A * | 3/2018 |
| KR | 10-2021-0118364 | | 9/2021 |
| WO | 2019/118849 | | 6/2019 |

OTHER PUBLICATIONS

EPO machine generated English translation of JP-2018032519-A (Year: 2018).*
EPO machine generated English translation of CN-217655954-U (Year: 2022).*
European Patent Office, Appl. 23188013.9, Extended European Search Report; Apr. 17, 2024.

* cited by examiner

*Primary Examiner* — Sean P Cullen
*Assistant Examiner* — Kimberly Wyluda
(74) *Attorney, Agent, or Firm* — Jones Day

(57) ABSTRACT

A battery pack comprising one or more battery modules and a support frame opposing the one or more battery modules in a first direction, the one or more battery modules including a plurality of battery cells stacked in the first direction to form a cell stack and a side cover opposing the cell stack in the first direction, wherein the side cover comprises a first inclined surface opposing the support frame and inclined with respect to the first direction.

12 Claims, 10 Drawing Sheets

BATTERY PACK COMPRISING A SUPPORT FRAME WITH AN INCLINE SURFACE

CROSS-REFERENCE TO RELATED APPLICATIONS

This application claims benefit of priority to Korean Patent Application No. 10-2022-0159545 filed on Nov. 24, 2022, the entire disclosure of which is incorporated herein by reference.

BACKGROUND

1. Field of the Invention

The present disclosure relates to a battery pack.

2. Description of Related Art

Unlike primary batteries, secondary batteries may be conveniently charged and discharged. As a result, secondary batteries are increasingly used as power sources for various mobile devices and electric vehicles. A secondary battery using a non-aqueous electrolyte, for example, may have a high energy density and good output characteristics. This may allow a plurality of such secondary batteries connected in series to drive a motor of an electric vehicle.

Although it is convenient, repeatedly charging and discharging a secondary battery may generate a gas in the battery that may cause the battery to expand in a width direction. In some power sources, a plurality of secondary battery cells may be packaged together into larger devices. In these devices, deformation of secondary battery cells in the width direction may deform the exterior of the packages and degrade electrical performance of device.

Accordingly, a structure capably of sufficiently absorbing expansion pressure of secondary battery cells is desired.

SUMMARY OF THE INVENTION

According to one aspect, a battery pack is provided comprising one or more battery modules and a support frame opposing the one or more battery modules in a first direction. The one or more battery modules comprise a plurality of battery cells stacked in the first direction to form a cell stack, and a side cover opposing the cell stack in the first direction, wherein the side cover comprises a first inclined surface, the first inclined surface opposing the support frame and inclined with respect to the first direction.

In an embodiment, the battery pack further comprises a lower frame, wherein the one or more battery modules are disposed on the lower frame. In an embodiment, the side cover has an upper surface above an upper surface of the lower frame, and a distance between the first inclined surface and the cell stack in the first direction decreases from the upper surface of the side cover to the upper surface of the lower frame in a direction toward the lower frame.

In an embodiment, the support frame comprises a second inclined surface that is inclined with respect to the first direction, wherein an angle between the first inclined surface and the upper surface of the lower frame is acute, and an angle between the second inclined surface and an upper surface of the lower frame is obtuse.

In an embodiment, the first inclined surface and the second inclined surface are parallel to each other.

In an embodiment, the side cover comprises a body portion comprising a first surface opposing the cell stack in the first direction and a second surface separated from the first surface in the first direction, and an extension portion protruding from the second surface of the body portion and coupled to the support frame. The first inclined surface is connected to an end of the extension portion and connected to the body portion according to the embodiment.

In an embodiment, the support frame further comprises a coupling portion protruding from the second inclined surface, and the side cover further comprises an insertion groove into which the coupling portion is inserted.

In an embodiment, the insertion groove exposes at least a portion of the extension portion of the side cover to the support frame.

In an embodiment, the battery pack further comprises a fastening member penetrating through the extension portion and fastened to the coupling portion.

In an embodiment, the coupling portion comprises a coupling surface extending in the first direction, wherein the extension portion is disposed on the coupling surface, and the fastening member is fastened to the coupling surface of the coupling portion.

In an embodiment, a plurality of coupling portions are disposed on the second inclined surface along a second direction perpendicular to the first direction.

In an embodiment, the first inclined surface and the body portion of the side cover define a hollow portion enclosed therein.

In an embodiment, the battery module comprises a second side cover, and the cell stack is disposed between the first side cover and the second side cover.

In an embodiment, the one or more battery modules comprise an end cover coupled to the side cover and extending in a second direction perpendicular to the first direction, and a busbar electrically connected to the plurality of battery cells and disposed between the plurality of battery cells and the end cover.

In an embodiment, at least one of the plurality of battery cells comprises a case accommodating an electrode assembly, and a cap assembly coupled to the case and comprising an electrode electrically connected to the electrode assembly, wherein the one or more battery modules further comprises an upper cover disposed above the cap assembly.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
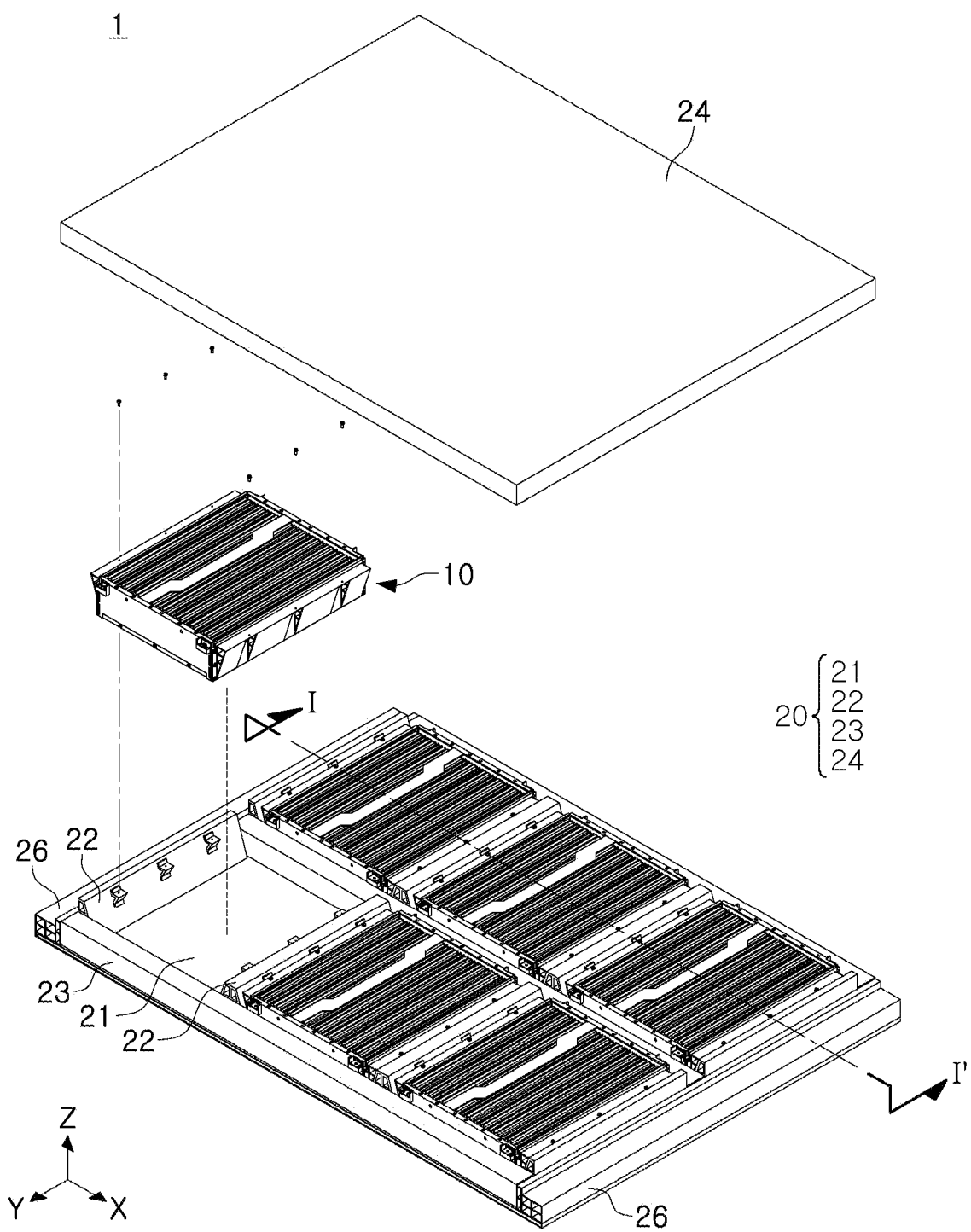
FIG. 1 depicts a perspective view of a battery pack according to an embodiment of the present disclosure.

Hereinafter, embodiments of the present disclosure will be described as follows with reference to the attached drawings. It is to be understood that the components of the embodiments, as generally described and illustrated in the figures herein, may be arranged and designed in a wide variety of different configurations in addition to the described embodiments. Thus, the following description of the embodiments represented in the figures is not intended to limit the scope of the embodiments as claimed, but is merely representative of some example embodiments. Accordingly, shapes and sizes of the elements in the drawings may be exaggerated for clarity of description.

Furthermore, described features, characteristics, or structures may be combined in any suitable manner in one or more embodiments. In the following description, numerous specific details are provided for a thorough understanding of embodiments. A person having ordinary skill in the relevant art will recognize, however, that the various embodiments may be practiced without one or more of the specific details, or with other methods, components, materials, etc. In other instances, well-known structures, materials, or operations are not shown or described in detail to avoid obfuscation and improve clarity.

An expression used in the singular encompasses the expression of the plural, unless it has a clearly different meaning in the context. The terms, "include," "comprise," "is configured to," or the like are used to indicate the presence of features, numbers, steps, operations, elements, portions or combinations thereof, and do not exclude the possibilities of other combination or the addition of one or more features, numbers, operations, elements, portions or combinations thereof.

In described embodiments, terms such as an upper side, an upper portion, a lower side, a lower portion, a side surface, a front surface, a rear surface, or the like, are represented based on the directions in the drawings, and may be used differently if the direction of an element is changed.

The terms "first," "second," and the like may be used to distinguish one element from the other, and may not limit a sequence and/or an importance, or others, in relation to the elements. In some embodiments, a first element may be referred to as a second element, and similarly, a second element may be referred to as a first element without departing from the scope of right in the example embodiments.

Example systems and methods herein provide one or more battery packs that include battery modules that include multiple battery cells (e.g., rechargeable secondary battery cells). According to various embodiments, a battery pack may be provided comprising an arrangement of one or more battery modules. Each battery module of the one or more battery modules may comprise a plurality of battery cells stacked in a first direction. Battery packs and battery modules described herein may provide sufficient structure to absorb expansion pressure of battery cells during repeated charge and discharge.

Furthermore, battery packs and battery modules described herein may ensure ease of assembly. Increasing energy capacity requirements for batteries may require structures capable of accommodating high energy density batteries without sacrificing manufacturing and assembly time and ease. The structures described herein may allow for the manufacture and easy assembly of high energy capacity and high energy density battery modules and battery packs.

FIG. 1 is a perspective view of battery pack 1 in accordance with an embodiment. The battery pack 1 includes a plurality of battery modules 10 and a pack housing 20 having a space in which the battery modules 10 are accommodated.

The pack housing 20 includes a lower frame 21 covering a lower portion of the battery module 10, a side frame 23 connected to the lower frame 21 and forming at least one side of the pack housing 20 in a first direction (X-axis direction), an end frame 26 connected to the lower frame 21 and forming at least one side of the pack housing 20 in a second direction (Y-Axis direction), a support frame 22 connected to the lower frame 21 and extending in a different direction from the side frame 23, and an upper frame 24 covering an upper portion of the battery module 10.

In an embodiment, a plurality of battery modules 10 may be accommodated in pack housing 20 of a battery pack 1. The pack housing 20 may include a lower frame 21 on which the battery module 10 is disposed, side frames 23 disposed on the lower frame 21 and forming side surfaces of the pack housing 20 in a first direction (X-axis direction), end frames 26 disposed on the lower frame 21 and forming side surfaces of the pack housing 20 in a second direction (Y-axis direction) Thus, the side frames 23 and the end frames 26 may form the side surfaces of the pack housing 20. The pack housing 20 may further include a plurality of support frames 22 extending parallel to end frames 26 between the side frames 23, and an upper frame 24 covering the upper portion of the battery module 10.

The lower frame 21 may form the lower surface of the pack housing 20. The lower frame 21 may be provided as a rectangular plate-shaped member or a polygonal plate-shaped member, but the specific shape thereof is not limited thereto. The lower frame 21 may have an upper surface defining the area on which the battery modules 10 may be disposed.

A plurality of battery modules 10 may be disposed on the upper surface of the lower frame 21. For example, the plurality of battery modules 10 may be arranged in a first direction (X-axis direction) or a second direction (Y-axis direction) on the lower frame 21.

The lower frame 21 may be formed of a rigid metal material. For example, at least a portion of the lower frame 21 may include aluminum. A lower frame 21 including aluminum, may rapidly dissipate heat energy generated in the battery module 10 to the outside of the battery pack 1 due to excellent thermal conductivity of aluminum.

A heat dissipation member (not illustrated) may be disposed between the lower frame 21 and the battery module 10. A first surface of the heat dissipation member (not illustrated) may be in contact with the cell stack 100 of the battery module 10 and another surface of the heat dissipation member opposite to the first surface may be in contact with the lower frame 21. The heat dissipation member (not illustrated) may be provided as a thermal adhesive. A heat dissipation member (not illustrated) may fill a space between the battery module 10 and the lower frame 21 so as to actively perform heat transfer by conduction. Accordingly, heat dissipation efficiency of the battery pack 1 may be increased.

In an embodiment, a side frame 23 may be connected to the lower frame 21 and may form at least one side surface of the pack housing 20 in a first direction (X-axis direction), and an end frame 26 may be connected to the lower frame 21 and may form at least one side surface of the pack housing 20 in a second direction (Y-axis direction). The side frame 23 may be a beam structure extending along the upper surface of the lower frame 21 in the first direction (X-axis direction), and the end frame 26 may be a beam structure extending along the upper surface of the lower frame 21 in the second direction (Y-axis direction). A plurality of side frames 23 may be provided and spaced apart from each other on the upper surface of the lower frame 21 in the second direction (Y-axis direction) perpendicular to the first direction (X-axis direction), between a plurality of the end frames 26.

The support frame 22 may be connected to the lower frame 21 and the side frame 23. For example, the support frame 22 may be disposed to intersect the upper surface of the lower frame 21 in the second direction (Y-axis direction).

The support frame 22 may be disposed to partition the inner space of the pack housing 20. For example, a plurality of support frames 22 may be spaced apart from each other in a first direction (X-axis direction) on the upper surface of the lower frame 21, and one or more battery modules 10 may be disposed between two adjacent support frames 22.

At least a portion of the plurality of support frames 22 may be disposed between the battery modules 10. For example, the support frame 22 may be disposed between the plurality of battery modules 10 disposed in the first direction (X-axis direction). Accordingly, the support frame 22 may oppose the battery module 10 in the first direction.

Similar to the lower frame 21, the support frame 22 may be formed of a metal material having a predetermined degree of rigidity. For example, at least a portion of the support frame 22 may be formed of aluminum in order to efficiently dissipate heat.

The pack housing 20 may include an upper frame 24 disposed above the battery module 10 and closing the inner space of the pack housing 20. The upper frame 24 may be fixed to at least one of the side frames 23, the end frames 26 or the support frame 22 and may cover the upper portion of the battery module 10.

The battery module 10 may be disposed on the upper surface of the lower frame 21 of the pack housing 20. The battery module 10 may be inserted into the pack housing 20 in one direction (e.g., a negative Z-axis direction). For example, the battery module 10 may be inserted in a direction perpendicular to the upper surface of the lower frame 21 and may be disposed on the lower frame 21. In the description below, a direction in which the battery module 10 is inserted into the pack housing 20 is defined as an "insertion direction." The battery modules 10 are described in greater detail with reference to FIG. 2 and FIG. 3.

Figure 2:
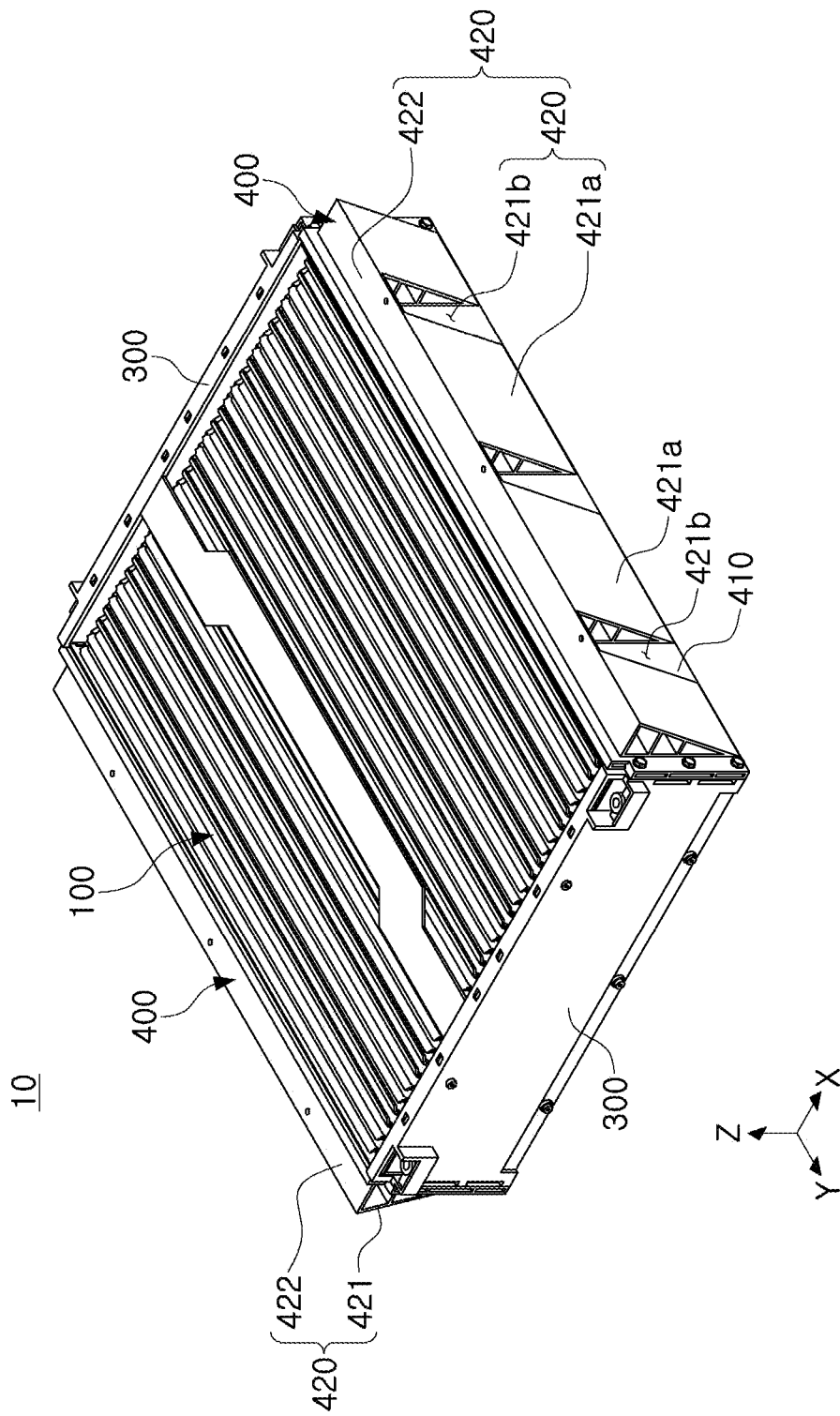
FIG. 2 depicts a perspective view of a battery module included in a battery pack according to an embodiment of the present disclosure.
Figure 3:
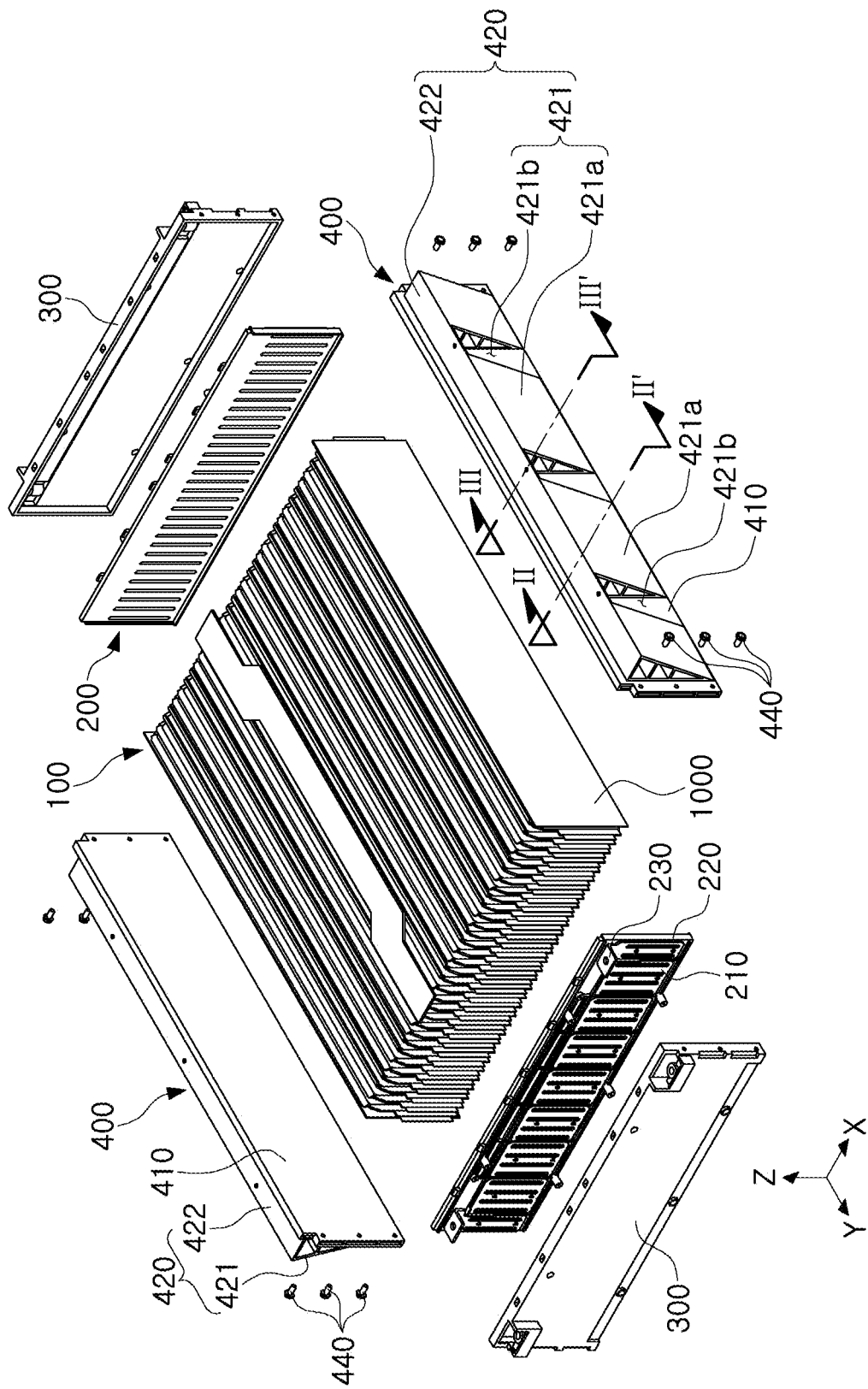
FIG. 3 depicts an exploded perspective view of a battery module according to an embodiment of the present disclosure.

FIG. 2 is a perspective view of a battery module 10 included in battery pack 1 according to an embodiment. FIG. 3 is an exploded perspective view of a battery module according to an embodiment. Each of the plurality of battery modules 10 may include one or more battery cells 1000 that may be configured to output or store electrical energy.

In battery module 10, a plurality of battery cells 1000 may be stacked with each other to form a cell stack 100. The battery module 10 may further include a busbar assembly 200 electrically connected to the battery cells 1000 of the cell stack 100 and an end cover 300 covering the busbar assembly 200.

The cell stack 100 may include a plurality of battery cells 1000 electrically connected to each other. In one cell stack 100, the plurality of battery cells 1000 may be stacked in a first direction (e.g., an X-axis direction). In the following description, the stacking direction of the battery cells 1000 included in the cell stack 100 is referred to as the "first direction" or the "cell stacking direction."

As a non-limiting example, the battery cells 1000 included in the battery module 10 may be a pouch-type secondary battery. Battery cells 1000 may have a structure in which an electrode assembly (not illustrated) is accommodated in a pouch. In a pouch-type secondary battery, an electrode assembly (not illustrated) and an electrolyte solution (not illustrated) may be accommodated in a pouch formed by forming one or a plurality of exterior materials.

However, the battery cells 1000 may be various other types of batteries. For example, the battery cells may be configured as prismatic can-type secondary batteries. Alternatively, the battery cells may be formed into a bundle by grouping together a plurality of pouch-type secondary batteries. Specifics of the battery cells will be fully described later with respect to FIG. 8.

The battery module 10 may include a busbar assembly 200 electrically connected to the battery cells 1000 of the cell stack 100. The busbar assembly 200 may be disposed on at least one side of the cell stack 100 and may electrically connect the battery cells 1000 to each other. A pair of busbar assemblies 200 may be provided and may be disposed on both ends of the cell stack 100, respectively. Additionally, a pair of busbar assemblies 200 for adjacent cell stacks 100 in adjacent battery modules 10 may be connected to each other and may be configured as a single component.

A busbar assembly 200 may include a plurality of busbars 210 electrically connecting the battery cells 1000 of the cell stack 100 to each other, and a busbar frame 220 supporting the busbars 210.

Busbars 210 may be formed of a conductive material and may electrically connect the plurality of battery cells 1000 to each other. Busbars 210 may be electrically connected to the battery cells 1000 and fixed to the busbar frame 220. A terminal portion 230 may be disposed on a portion of a busbar 210. The terminal portion 230 may be electrically connected to an external circuit of the battery module 10.

The busbar frame 220 may support the busbar 210 such that the busbars 210 are stably connected to the battery cells 1000. The busbar frame 220 may include a non-conductive material (e.g., plastic) having a predetermined degree of rigidity and may structurally support the busbars 210.

The busbar frame 220 may oppose, and interface with, at least one side of the cell stack 100. For example, referring to FIG. 3, the busbar frame 220 may be disposed to oppose the cell stack 100 in a second direction (e.g., the Y-axis direction). Here, the second direction (Y-axis direction) may be a direction perpendicular to the first direction (X-axis direction). In the following description, the second direction (Y-axis direction) may refer to a direction parallel to a direction in which the busbar assembly 200 and the cell stack 100 oppose each other.

The end cover 300 may be disposed on an outermost region of one side of the battery module 10. The end cover 300 may include a rigid material (e.g., a metal such as aluminum or a resin compound) and may protect the cell stack 100 from external impact.

The end cover 300 may be coupled to the busbar assembly 200 and may cover the busbar 210. To prevent an electrical short between the end cover 300 and the busbar 210, an insulating cover (not illustrated) including an insulating material may be disposed between the end cover 300 and the busbar assembly 200.

The battery module 10 may further comprise at least one side cover 400 opposing at least one side of the cell stack 100. The side cover 400 may include a rigid material (e.g., a metal such as aluminum or a resin compound) and may protect the cell stack 100 from external impact.

In an embodiment, as depicted in FIG. 3, the battery module 10 may include first and second end covers 300 and first and second side covers 400. The cell stack 100 may be stacked in a first direction (e.g. the X-axis direction) such that first and second ends of the cell stack 100 are aligned along a second direction (e.g. the Y-axis direction). First and second end covers 300 may each be disposed along a side corresponding to the ends of the cell stack 100. First and second end covers 300 may extend along the first direction, and oppose the cell stack 100 in the second direction. First and second side covers 400 may each be disposed along a side of the cell stack 100. First and second side covers 400 may extend along the second direction and oppose the cell stack 100 in the first direction.

The pair of side covers 400 combined with the pair end covers 300 may cover four side faces of the battery module 10 and may protect the cell stack 100 from the external environment. In this embodiment, the cell stack 100 may be disposed between the pair of side covers 400.

In an embodiment, both ends of a side cover 400 may be attached to an end cover 300. A fastening member 440 may be used to attach the side cover 400 and the end cover 300. For example, a plurality of fastening members 440 may penetrate through the side cover 400 and may be fastened to the end cover 300, and accordingly, the side cover 400 and the end cover 300 may be fixed to each other. However, the method of attaching the side cover 400 and the end cover 300 is not so limited. For example, the side cover 400 may be attached to the end cover 300 by welding, or other equivalent means of attachment.

The side covers 400 may oppose the battery cell 1000 in the first direction (X-axis direction), which is the cell stacking direction of the battery cells 1000. Accordingly, the side covers 400 may provide surface pressure to battery cells 1000.

For example, when battery cells 1000 are repeatedly charged and discharged, battery cells 1000 may expand due to a gas generated in the battery cells 1000. This expansion may cause deterioration of the electrical performance of the battery cells. To prevent expansion, side covers 400 may be configured to withstand pressure caused by expansion of the battery cells 1000. That is, side covers 400 may be disposed to oppose the cell stack 100 in a first direction (X-axis direction), and may provide surface pressure oppressing expansion pressure in the first direction (X-axis direction), generated in the battery cells 1000.

Referring to FIGS. 2 and 3, a side cover 400 may include a body portion 410 adjacent to and opposing the cell stack 100 in the first direction, and a guide portion 420. Guide portion 420 may assist the positioning of a battery module 10 when being inserted into a battery pack 1. Guide portion 420 may allow the battery module to be to be stably coupled to the battery pack. In an embodiment, the guide portion 420 may be connected to the body portion 410, increasing structural rigidity of the side cover 400.

A first surface of the body portion 410 may oppose the cell stack 100 in a first direction (X-axis direction). A second surface of the body portion 410 may be separated from the first surface in the first direction. The guide portion 420 may be disposed on the second surface side opposite and extend in the first direction.

The body portion 410 may be configured to apply surface pressure to the cell stack 100 when the cell stack 100 swells. For example, the body portion 410 may oppose a side surface of a battery cell 1000 and may apply surface pressure to the battery cell 1000.

The guide portion 420 may be connected to the body portion 410 and protrude from the battery module 10 in an outward direction. The protruding guide portion 420 may grant the side cover 400 greater structural rigidity than simply having a plate-shaped shape.

The guide portion 420 may include an extension portion 422 protruding from the body portion 410. The extension portion 422 may have a structure protruding in an outward direction from the battery module on the body portion 410. For example, the first extension portion 422 may be configured to extend in a first direction (X-axis direction) from the other surface of the body portion 410, and accordingly, the first extension portion 422 may form a structure perpendicular to the body portion 410.

The guide portion 420 may comprise a first inclined surface 421a inclined with respect to the cell stacking direction. As used herein, "inclined with respect to" a particular direction means that an angle is defined between a line extending in the direction and the inclined surface. For example, referring to FIG. 3, the first inclined surface 421a of the inclined portion 421 may be a surface inclined with respect to the first direction (X-axis direction). Alternatively, the first inclined surface 421a may be defined by its incline with respect to another surface. The components of a side cover 400 are described further with reference to FIG. 4.

Figure 4:
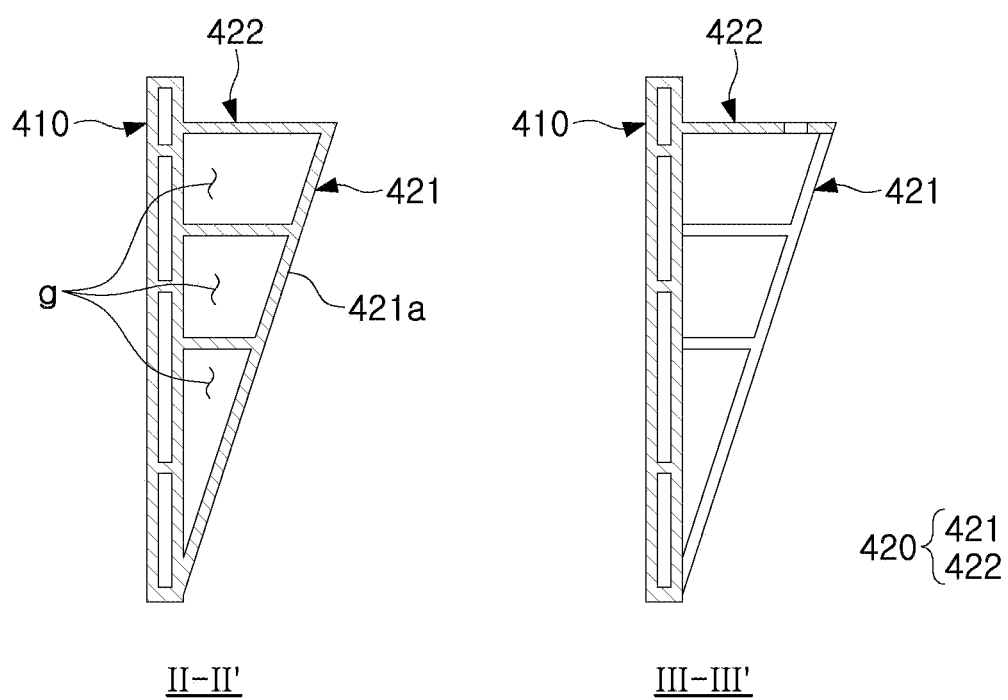
FIG. 4 depicts a cross-sectional view taken along line II-II' and line III-III' in FIG. 3.

FIG. 4 depicts cross-sectional views of a side cover 400 according to an embodiment. The views depicted in FIG. 4 are taken along lines II-II' and III-III' of FIG. 3. In an embodiment, the first inclined surface 421a may be one surface of an inclined portion 421. The extension portion 422 may be connected to the first inclined surface 421a, and the inclined portion 421 may be connected to both the extension portion 422 and the body portion 410. For example, the first inclined surface 421a may be an inclined surface extending from the end of the extension portion 422 to the body portion 410.

The side cover 400 may comprise a structure in which a hollow portion g is formed between an inclined portion 421, an extension portion 422, and a body portion 410. By including the hollow portion, a side cover 400 may be more lightweight while maintaining excellent structural rigidity.

A distance may be formed between the inclined portion 421 and the body portion 410. The distance between the inclined portion 421 and the body portion 410 may be increase along a height direction of the battery module 10. Here, the "height direction" of the battery module 10 may refer to a positive Z-axis direction in FIG. 3. For example, the upper surface of the lower frame 21 may define a first surface, and the upper surface of the body portion 410 may define a second surface. The distance between the inclined portion 421 and the body portion 410 increases along the Z-axis from the first upper surface to the second upper surface.

Similarly, a distance may be defined between the first inclined portion 421a and the cell stack 100. According to an embodiment, this distance may decrease in a direction moving towards the lower frame 21 from the top surface of the side cover 400.

In an embodiment, the side cover may have a wedge-shaped cross-sectional structure formed by the body portion 410 and the guide portion 420. This structure may allow the side cover 400 to guide the assembly position of the battery module 10 in the process of assembling battery modules 10 into a battery pack 1.

Additionally, the side cover 400 may have a cross-sectional structure comprising a triangular or trapezoidal shape surrounded by a body portion 410. This structure may allow the side cover to effectively withstand the expansion pressure of the battery cell.

An upper surface or a lower surface of the battery module 10 may be configured such that the cell stack 100 may be exposed. For example, the battery module 10 may have a structure in which the cell stack 100 may be disposed in a rectangular frame formed by combining first and second end covers 300 with first and second side covers 400. The battery module 10 may not have a cover member covering the upper or lower surface of the cell stack 100. Accordingly, the battery cells 1000 of the cell stack 100 may be exposed along top or bottom surfaces of the battery module 10. This structure may allow the cell stack 100 to be in direct contact with components outside of the battery module 10. For example, the cell stack 100 may be in direct contact with the lower frame 21 of the battery pack 1 along the bottom surface of the battery module. Alternatively, the cell stack 100 may be in direct contact with a heat dissipation member (not illustrated) along the top or bottom surface of the battery module 10. Accordingly, heat may be smoothly discharged from the cell stack 100 from top and/or bottom surfaces of the battery module 10, increasing heat dissipation efficiency of the battery module 10.

A coupling mechanism between the battery module 10 and the battery pack 1 in accordance with some embodiments is described in greater detail with reference to FIGS. 5-7.

Figure 5:
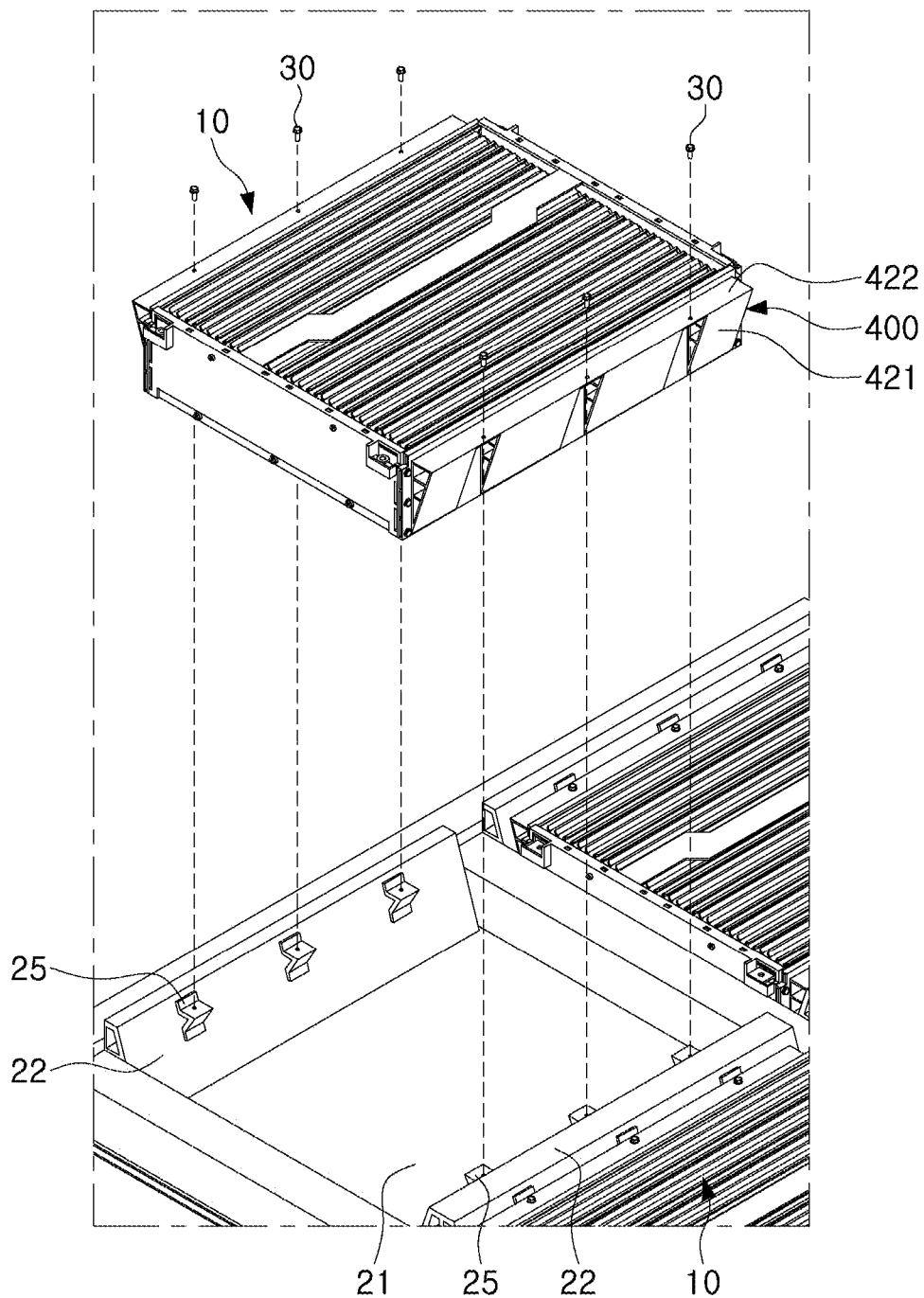
FIG. 5 depicts an exploded perspective view of a battery module and a portion of a battery pack according to an embodiment of the present disclosure.
Figure 6:
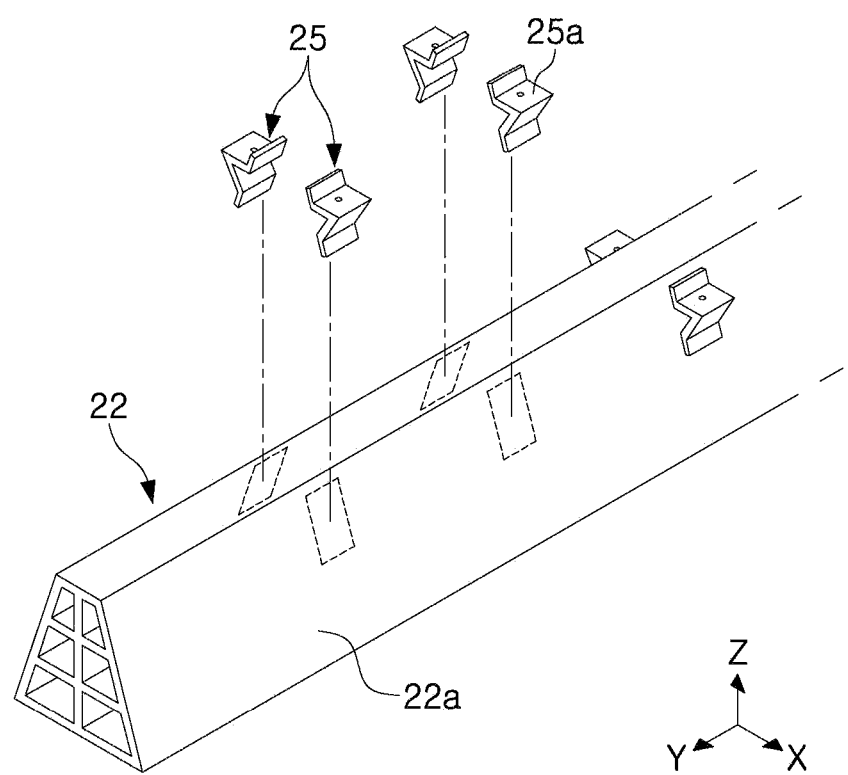
FIG. 6 depicts an exploded perspective view of a support frame of a battery pack according to an embodiment of the present disclosure.

FIG. 5 is an exploded perspective view of a battery module and a portion of a battery pack according to an embodiment. FIG. 6 depicts an exploded perspective view of a support frame of a battery pack according to an embodiment. FIG. 7 depicts a cross-sectional view of a battery pack according to an embodiment. The view depicted in FIG. 7 is taken along line I-I' of FIG. 1.

The battery module 10 and the battery pack 1 described with reference to FIGS. 5-7 may correspond to the battery module 10 and the battery pack 1 described with reference to FIGS. 1-4 above, and thus, overlapping descriptions may not be provided.

Figure 7:
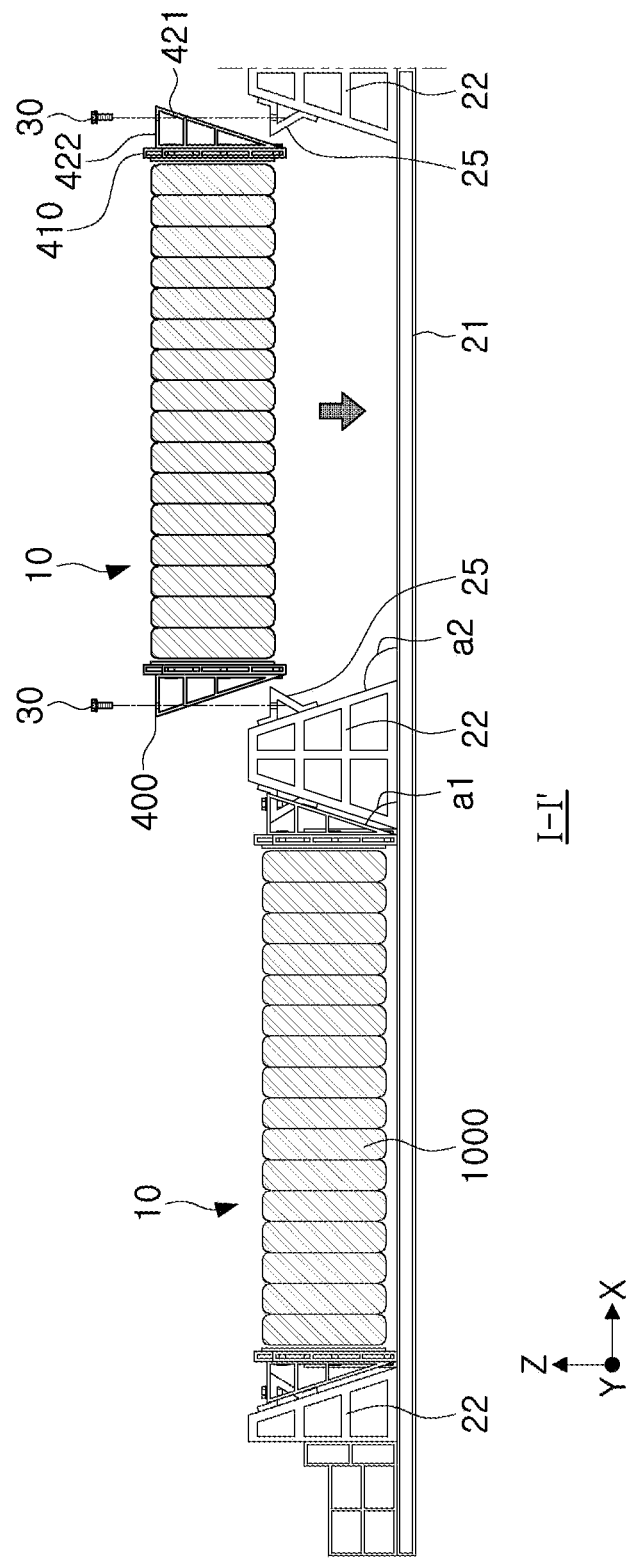
FIG. 7 depicts a cross-sectional view taken along line I-I' in FIG. 1.

In a mode of assembly, a battery module 10 may be inserted into the pack housing 20 in a specific direction (e.g., the Negative Z-axis direction in FIG. 7). For example, the battery module 10 may be inserted into the pack housing in a direction (the Negative Z-axis direction) perpendicular to the first direction (X-axis direction). In the following description, a direction in which the battery module 10 is assembled to the pack housing 20 may be defined as an "assembly direction."

The battery module 10 may be coupled to the support frame 22 and may be fixed to the pack housing 20. For example, the battery module 10 may be configured such that the side cover 400 may be abuts the support frame 22.

In an embodiment, the side cover 400 of the battery module 10 may be used as a coupling structure. For example, the side cover 400 may be coupled to the support frame 22 of the pack housing 20, and accordingly, the battery module 10 may be securely fixed in the pack housing 20.

The plurality of support frames 22 may be spaced apart from each other in a first direction (X-axis direction) along the upper surface of the lower frame 21. The battery modules 10 may be disposed between the support frames 22.

A width of the support frame 22 in the first direction (X-axis direction) may be formed to be gradually decrease in a direction from the lower frame 21 toward the upper frame 24 (positive Z-axis direction). Accordingly, at least a portion of the support frame 22 may form an inclined surface. The inclined surface of the support frame 22 may be defined as a second inclined surface 22a.

The second inclined surface 22a of the support frame 22 may be inclined with respect to the assembling direction (negative Z-axis direction) and inclined with respect to the first direction (X-axis direction). That is, the second inclined surface 22a may be inclined such that an angle a2 between the second inclined surface 22a and the upper surface of the lower frame 21 is obtuse.

The distance in the first direction (X-axis direction) between the second inclined surface 22a of one of the support frames 22 and the second inclined surface 22a of the adjacent support frame 22 may increase in a direction (e.g., in the positive Z-axis direction in FIG. 7) from the lower frame 21 toward the upper frame 24.

In an embodiment, the second inclined surface 22a of the support frame 22 may oppose the first inclined surface 421a of the side cover 400. An angle a1 between the first inclined surface 421a and the upper surface of the lower frame 21 may be acute. Referring to FIG. 7, the side cover 400 may be configured such that the width thereof may decrease in a direction (e.g., a negative Z-axis direction) toward the lower frame 21. In this embodiment, an angle a1 formed between the first inclined surface 421a of the side cover 400 and the lower frame 21 may be acute.

As a result, the distance in the first direction (X-axis direction) between the first inclined surface 421a and the cell stack 100 may decrease in a direction toward the lower frame 21 (negative Z-axis direction).

The structures of the first inclined surface 421a and the second inclined surface 22a, may cause the side cover 400 to guide the battery module 10 into its position within the pack housing 20. For example, the battery module 10 may be configured such that the first inclined surface 421a may slide along the second inclined surface 22a and may be disposed on the lower frame 21.

Referring to FIG. 7, while the battery module 10 is disposed between the two support frames 22, the first inclined surface 421a of the battery module 10 may slide along the inclined surface 22a of the support frame 22, and accordingly, the battery module 10 may be naturally disposed in a predetermined position. That is, the guide portion 420 of the battery module 10 may guide the battery module 10 to be easily and accurately assembled to the pack housing 20.

The second inclined surface 22a and the first inclined surface 421 may be substantially parallel, although the positioning of the inclined surfaces is not so limited. In an embodiment, the second inclined surface 22a may need only be sufficiently inclined to allow the first inclined surface 421a to slide down the second inclined surface 22a during assembly.

To further assist in assembly, a coupling portion 25 protruding in a direction toward the battery module 10 and coupled to the battery module 10 may be disposed on the support frame 22. In an embodiment, the coupling portion 25 may be disposed on the second inclined surface 22a of the support frame 22. For example, the coupling portion 25 may be provided as a separate member from the support frame 22 and may be bonded or welded to the second inclined surface 22a. Alternatively, the coupling portion 25 may be a structure integrally formed with the support frame 22, and at least a portion of the structure may protrude in a direction toward the battery module 10 on the second inclined surface 22a.

The coupling portion 25 may be formed of the same material as that of the support frame 22. However, the material of the coupling portion 25 is not limited thereto.

A plurality of coupling portions 25 may be spaced apart from each other in the second direction (Y-axis direction). As shown in FIG. 6, a plurality of coupling portions 25 may be disposed on the second inclined surface 22a. The plurality of coupling portions may be spaced along the second direction (Y-axis direction) with a constant distance therebetween.

In an embodiment, the coupling portion 25 may attach to the side cover 400 of the battery module 10.

The side cover 400 may be structured to avoid interference with coupling portions 25. For example, the side cover 400 may include an insertion groove 421b into which a coupling portion 25 may be inserted. The insertion groove 421b may be formed on the inclined portion 421. The side cover 400 may be configured such that at least a portion of the extension portion 422 may be exposed in a direction toward the lower frame 21 through the insertion groove 421b. Accordingly, when the coupling portion 25 of the support frame 22 is inserted into the insertion groove 421b, the extension portion 422 of the side cover 400 may be disposed opposite to, or disposed on, the coupling portion 25.

The coupling portion 25 may include a coupling surface 25a on which the extension portion 422 of the side cover 400 may be disposed. The coupling surface 25a may be configured to be substantially parallel to the upper surface of the lower frame 21. Alternatively, at least a portion of the coupling surface 25a may be configured to be perpendicular to the first direction (X-axis direction).

In an embodiment, a fastening member 30 may penetrate through the extension portion 422 and may fasten to the coupling surface 25a such that the coupling portion 25 and the side cover 400 may be attached. The fastening member 30 may comprise a screw or a bolt, for example.

The coupling structure between the coupling portion 25 and the battery module 10 is not, however, limited to the above-described example. In other embodiments, the coupling portion 25 of the support frame 22 and the side cover 400 of the battery module 10 may be attached without a fastening member 30.

Coupling of the side cover 400 and the support frame 22 may provide a battery module 10 and a battery pack 1 with effective resistance to any expansion pressure caused by the swelling of battery cells 1000. That is, since the support frame 22 may be securely attached to the side cover 400 and may support the side cover 400 in the first direction (X-axis direction), the side cover 400 may withstand the expansion pressure of battery cells 1000.

The side cover 400 and support frame 22 according to previously described embodiments may provide improved structural rigidity as compared to a general plate-shaped side cover and housing frame. Accordingly, the thicknesses of the side cover 400 and the support frame 22 may be reduced without impairing structural rigidity of the battery pack 1.

The reduced thickness also may allow for more battery cells 1000 to be disposed in a battery pack of the same size leading to improved energy density of the battery module 10 and battery pack 1.

In some embodiments, the battery cells in a battery module and battery pack may be configured as a prismatic secondary battery including a rigid case. These embodiments are described in detail with reference to FIGS. 8-10.

Figure 8:
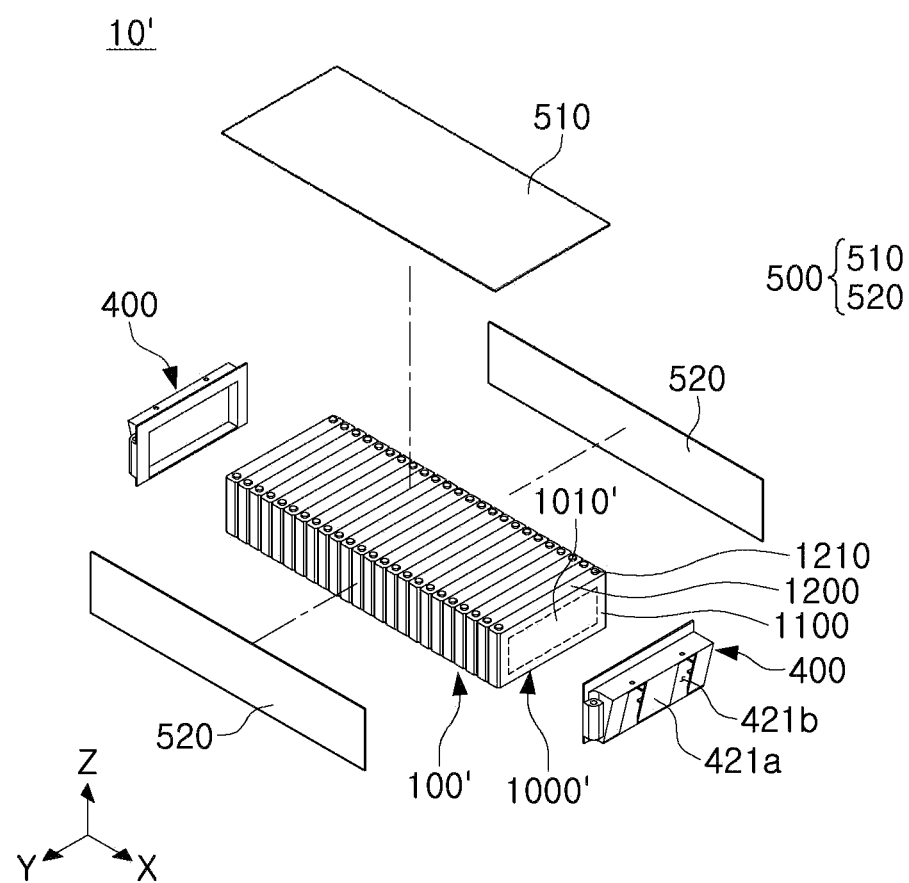
FIG. 8 depicts an exploded perspective view of a battery module according to an embodiment of the present disclosure.
Figure 9:
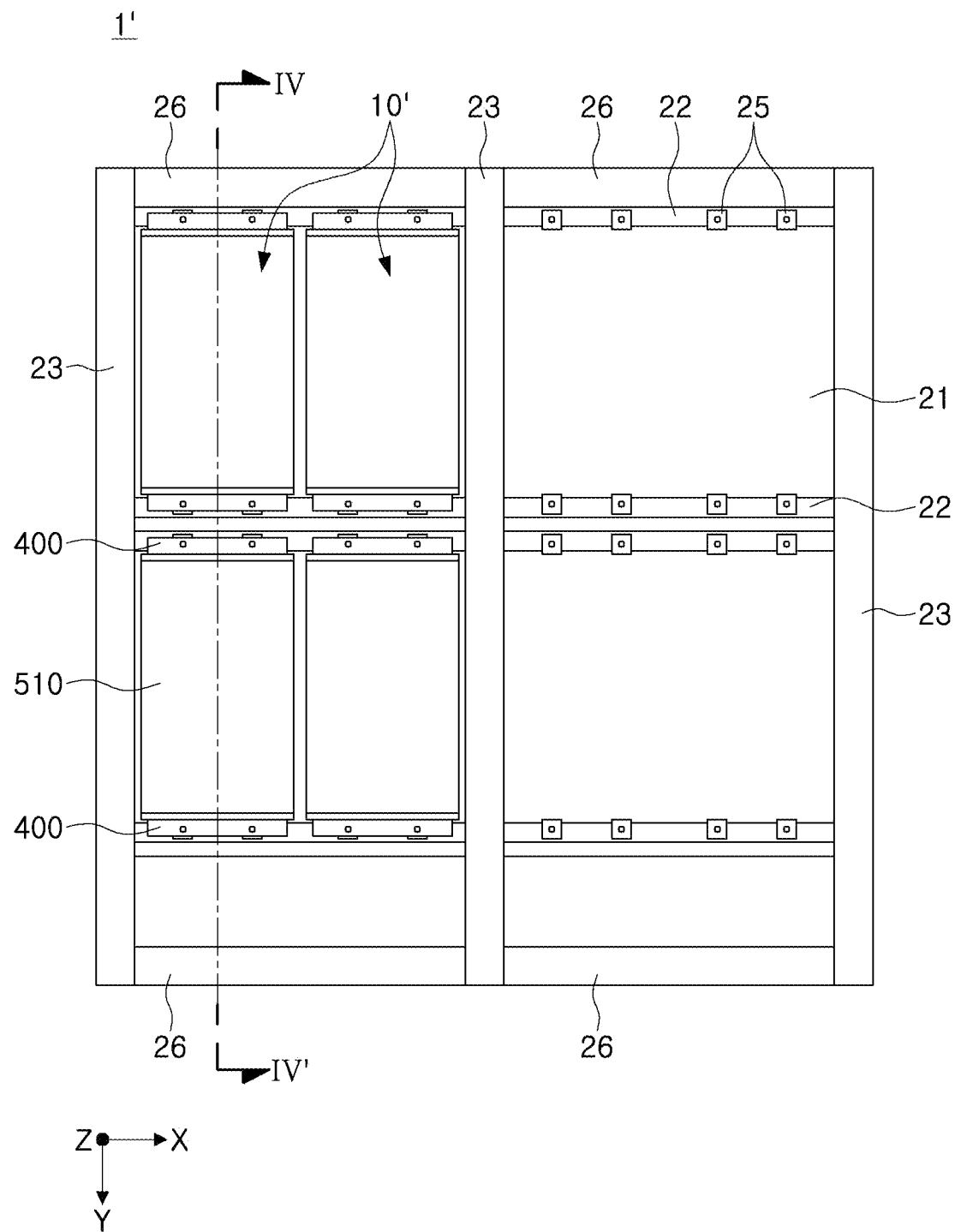
FIG. 9 depicts a top view of a battery pack according to an embodiment of the present disclosure.
Figure 10:
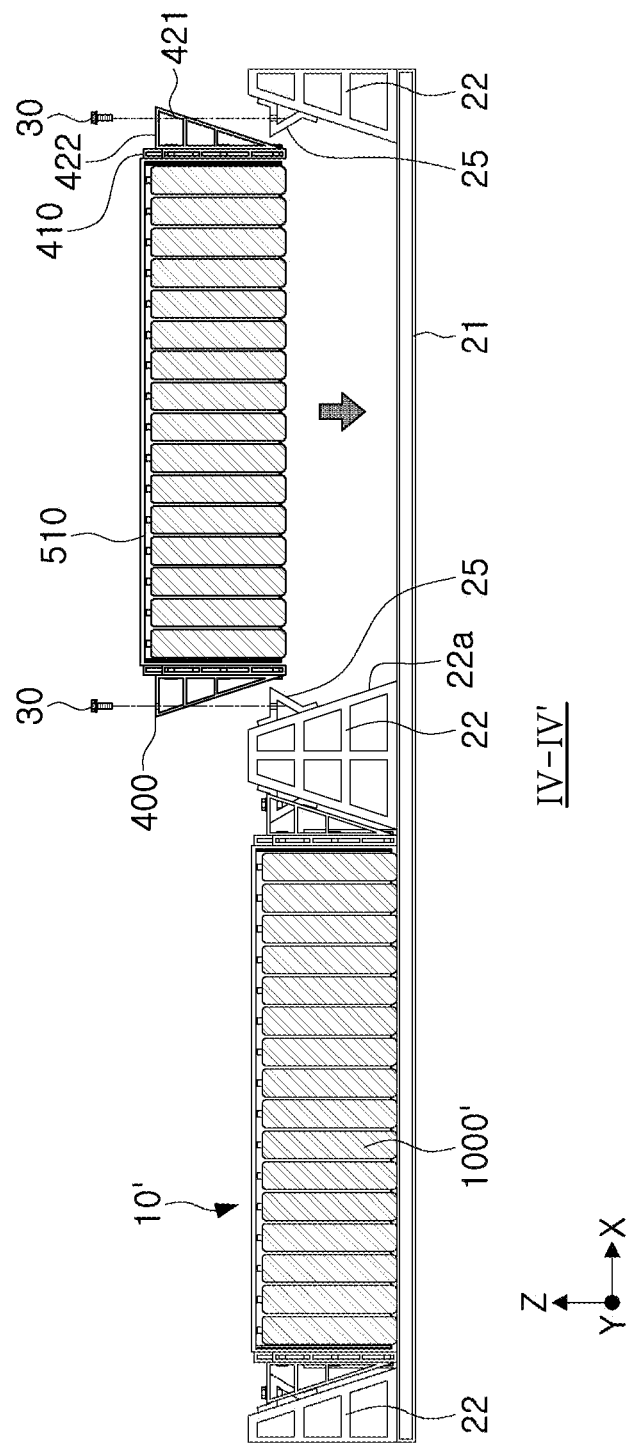
FIG. 10 depicts a cross-sectional view taken along line IV-IV' in FIG. 9.

FIG. 8 is an exploded perspective view of a battery module 10' according to an embodiment. FIG. 9 is a top view of a battery pack 1' having battery modules 10' accommodated therein according to an embodiment. FIG. 10 is a cross-sectional view of the embodiment of FIG. 9. The view depicted in FIG. 10 is taken along line IV-IV' in FIG. 9.

In an embodiment, a battery module 10' may comprise a plurality of battery cells 1000' stacked in a first direction to form a cell stack 100'. A battery cell 1000' may be a prismatic secondary battery in which an electrode assembly 1010' is accommodated in a rigid case 1100. Here, the battery cell 1000' may include an electrode assembly 1010', a case 1100, and a cap assembly 1200. The case 1100 may be formed of a conductive metal such as aluminum, aluminum alloy, or nickel-plated steel. The case 1100 may have a hexahedral shape which may be open in at least one direction such that an electrode assembly 1010' may be inserted and disposed therein. The inner surface of the case 1100 may be insulated from an electrode assembly 1010' accommodated therein.

The cap assembly 1200 may close an internal space of the case 1100 by sealing an upper opening of the case 1100. At least a portion of the cap assembly 1200 may be formed of the same material as that of the case 1100 and may be welded and coupled to the case 1100.

The cap assembly 1200 may include an electrode terminal 1210 electrically connected to an electrode assembly 1010'. The electrode terminal 1210 may be formed of metal.

The battery cells 1000' may be stacked in a first direction (X-axis direction) to form a cell stack 100'. An adhesive member for fixing the battery cells 1000' to each other may be disposed between the battery cells 1000'. For example, an adhesive member may be formed of a binder material, and may be applied to or disposed between the cases 1100 of two adjacent battery cells 1000' to bind the adjacent cells together and maintain a stacked state of the battery cells 1000'.

In an embodiment, a module housing 500 may cover at least one side of the cell stack 100', and a side cover 400 may oppose the cell stack 100' in a stacking direction (X-axis direction). An integrally formed upper cover 510 may be disposed to cover the upper surface of the cell stack 100'. An end cover 520 may be connected to the upper cover 510 and may cover the side surface of the cell stack 100'.

The upper cover 510 may be disposed above the cap assembly 1200. To prevent the upper cover 510 from being electrically shorted with the cap assembly 1200, the battery module 10' may further include an insulating cover (not illustrated) formed of a non-conductive material between the upper cover 510 and the cell stack 100'. However, when the upper cover 510 is formed of an insulating material, an insulating cover (not illustrated) may not be provided.

Shapes and sizes of the upper cover 510 and the end cover 520 may not be limited to the embodiment illustrated in FIG. 8. For example, a plurality of upper covers 510 of the module housing 500 may be provided, and in this embodiment, different upper covers 510 may be disposed to cover different battery cells 1000'.

The module housing 500 may have an open shape in a downward direction (e.g., a negative Z-axis direction) of the battery module 10'. For example, the module housing 500 may have an inverted "U" shape in which the upper cover 510 and the end cover 520 may be connected to each other and the lower portion thereof may be open.

Accordingly, the battery module 10' may have a structure in which a lower surface of the cell stack 100' may be exposed to the outside of the module housing 500. For example, the battery cell 1000 may be disposed such that the cap assembly 1200 may oppose the upper cover 510 of the module housing 500, and accordingly, the lower surface 1210 of the case 1100 of the battery cell 1000' may be exposed to the outside of the module housing 500. Exposure of the case 1100 may increase heat dissipation efficiency of the battery module 10'.

In an embodiment, battery module 10' may include a side cover 400 opposing the cell stack 100' in a first direction (X-axis direction). Here, the specific structure and characteristics of the side cover 400 may correspond to the structure and characteristics of the side cover 400 described in the aforementioned embodiments with reference to FIGS. 1 to 7. That is, the side cover 400 may include a first inclined surface 421a inclined in a first direction (X-axis direction), and the first inclined surface 421a may be inclined such that that an angle with the lower frame 21 of the pack housing may be acute. The further detailed description of the side cover 400 may refer to the previous description with reference to FIGS. 1 to 7.

In an embodiment, the battery module 10' may be coupled to the pack housing 20. Referring to FIGS. 9 and 10, the pack housing 20 may include a lower frame 21 on which the battery module 10' is disposed, a side frame 23 forming at least one side of the pack housing 20 in a first direction (X-axis direction), an end frame 26 forming at least one side of the pack housing 20 in a second direction (Y-axis direction) and a support frame 22 coupled to the battery module 10'. Here, the pack housing 20 may have the same structure as that of the pack housing 20 in the aforementioned description described with reference to FIGS. 1 to 7, and a detailed description thereof may refer to the description above with reference to FIGS. 1 to 7.

As previously described above, support frame 22 of the pack housing 20 may have a second inclined surface 22a, and a coupling portion 25 protruding toward the battery module 10'. The coupling portion 25 may be disposed on the second inclined surface 22a and may attach to the battery module 10'. A side cover 400 of the battery module 10' may include an insertion groove 421b into which the coupling portion 25 of the support frame 22 is inserted. Here, the coupling structure between the support frame 22 and the battery module 10' may correspond to the coupling structure between the support frame 22 and the battery module 10 described with reference to FIGS. 1 to 7, and thus, the specific description thereof may refer to the description above with reference to FIGS. 1 to 7.

The battery modules 10 and 10' may not include a cover member covering the lower portion or the upper portion of the cell stack 100 and 100'. This exposure may lead to increased heat dissipation efficiency. The modules may instead have a side cover 400 structure having a guide portion 420 protruding in the cell stacking direction. This structure may lead to increased structural rigidity.

Additionally, the battery modules and battery packs as described herein may lead to increased efficiency of the manufacturing process. By including the first inclined surface and second inclined surface, ease of assembling the battery modules into battery packs may be improved.

Further advantages of the structures described herein may include a reduced size that may lead to an increase in the number of battery cells accommodating therein, and a sufficiently strong structure that has may absorb expansion pressure of battery cells and may have a high resistance against the swelling pressure of the battery cells. Additionally, the battery modules described may be rapidly, accurately, and firmly coupled to one another. Finally, the battery modules and battery packs described herein may have high energy density and good heat dissipation efficiency while also having strong resistance against battery cell swelling.

While the example embodiments have been illustrated and described above, it will be apparent to those skilled in the art that modifications and variations could be made without departing from the scope of the present disclosure as defined by the appended claims.

What is claimed is:

1. A battery pack, comprising:
   one or more battery modules; and
   a support frame opposing the one or more battery modules in a first direction;
   the one or more battery modules comprising:
      a plurality of battery cells stacked in the first direction to form a cell stack, and a side cover opposing the cell stack in the first direction,
   wherein the side cover comprises:
      a body portion comprising a first surface opposing the cell stack in the first direction and a second surface separated from the first surface in the first direction;
      an extension portion protruding from the second surface of the body portion and coupled to the support frame;
      a first inclined surface, the first inclined surface opposing the support frame along a second direction perpendicular to the first direction and inclined with respect to the first direction; and
      a plurality of insertion grooves disposed apart from each other in the second direction;
   wherein the support frame comprises:
      a second inclined surface inclined with respect to the first direction; and
      a plurality of coupling portions protruding from the second inclined surface of the support frame into the plurality of insertion grooves; and
   wherein the first inclined surface is connected to an end of the extension portion and connected to the body portion.

2. The battery pack of claim 1, further comprising:
   a lower frame, wherein the one or more battery modules are disposed on the lower frame;
   the side cover has an upper surface above an upper surface of the lower frame; and
   a distance between the first inclined surface and the cell stack in the first direction decreases from the upper surface of the side cover to the upper surface of the lower frame in a direction toward the lower frame.

3. The battery pack of claim 2,
   wherein an angle between the first inclined surface and the upper surface of the lower frame is acute; and
   an angle between the second inclined surface and the upper surface of the lower frame is obtuse.

4. The battery pack of claim 2, wherein the first inclined surface and the second inclined surface are parallel to each other.

5. The battery pack of claim 1, wherein the insertion groove exposes at least a portion of the extension portion to the support frame.

6. The battery pack of claim 1, further comprising:
a fastening member penetrating through the extension portion and fastened to a first coupling portion of the plurality of coupling portions.

7. The battery pack of claim 6,
wherein the first coupling portion comprises a coupling surface extending in the first direction;
the extension portion is disposed on the coupling surface and extending in the first direction; and
the fastening member is fastened to the coupling surface of the first coupling portion.

8. The battery pack of claim 1, wherein the plurality of coupling portions are disposed apart from each other along the second direction.

9. The battery pack of claim 1, wherein the first inclined surface and the body portion of the side cover define a hollow portion enclosed therein.

10. The battery pack of claim 1,
wherein the battery module comprises a first side cover and a second side cover; and
the cell stack is disposed between the first side cover and the second side cover.

11. The battery pack of claim 1, the one or more battery modules further comprising:
an end cover coupled to the side cover and extending in the second direction; and
a busbar electrically connected to the plurality of battery cells and disposed between the plurality of battery cells and the end cover.

12. The battery pack of claim 1, at least one of the plurality of battery cells comprising:
a case accommodating an electrode assembly; and
a cap assembly coupled to the case and comprising an electrode terminal electrically connected to the electrode assembly,
wherein the one or more battery modules further comprises an upper cover disposed above the cap assembly.

* * * * *